United States Patent
Childers et al.

(10) Patent No.: US 7,600,874 B2
(45) Date of Patent: Oct. 13, 2009

(54) PIXELATED COLOR WOBULATION

(75) Inventors: Winthrop D. Childers, San Diego, CA (US); David C Collins, Philomath, OR (US); William J. Allen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/782,530

(22) Filed: Jul. 24, 2007

(65) Prior Publication Data

US 2007/0268459 A1    Nov. 22, 2007

Related U.S. Application Data

(60) Division of application No. 11/078,212, filed on Mar. 10, 2005, now Pat. No. 7,267,442, which is a continuation-in-part of application No. 10/969,412, filed on Oct. 20, 2004, now Pat. No. 7,255,448.

(51) Int. Cl.
*G03B 21/14* (2006.01)

(52) U.S. Cl. .............. 353/31; 353/46; 348/742; 349/5

(58) Field of Classification Search .......... 353/34, 353/28, 29, 50, 97, 122, 31; 349/8, 62; 348/745–747, 348/756, 757, 771, 792
See application file for complete search history.

(56) References Cited

U.S. PATENT DOCUMENTS

| | | | |
|---|---|---|---|
| 6,407,726 B1 | 6/2002 | Endo et al. | |
| 6,657,603 B1 | 12/2003 | Demetresch | |
| 6,971,748 B2 * | 12/2005 | Cho et al. | 353/46 |
| 7,088,353 B2 * | 8/2006 | Fujii et al. | 345/204 |
| 7,113,231 B2 | 9/2006 | Conner | |
| 7,461,940 B2 * | 12/2008 | Blonde et al. | 353/84 |
| 7,549,756 B2 * | 6/2009 | Willis et al. | 353/84 |
| 2002/0003636 A1 | 1/2002 | Conner | |
| 2002/0008812 A1 * | 1/2002 | Conner et al. | 349/106 |
| 2002/0054424 A1 | 5/2002 | Miles | |
| 2003/0020809 A1 | 1/2003 | Gibbon | |
| 2003/0132901 A1 * | 7/2003 | Shimada | 345/87 |
| 2004/0222418 A1 | 11/2004 | Mochizuki | |
| 2004/0223126 A1 | 11/2004 | Hatakeyama et al. | |
| 2006/0098128 A1 | 5/2006 | Conner | |

FOREIGN PATENT DOCUMENTS

EP    1001306 A2    5/2000

* cited by examiner

*Primary Examiner*—William C Dowling

(57) ABSTRACT

A display system includes a mechanism to provide for simultaneous pixelated color with a spatial light modulator. Also included is a mechanism to project the simultaneous pixelated color to create a color field display on a viewing surface. A further mechanism moves the color field display relative to viewing surface to provide at least one of color and resolution increasing wobulation.

12 Claims, 7 Drawing Sheets

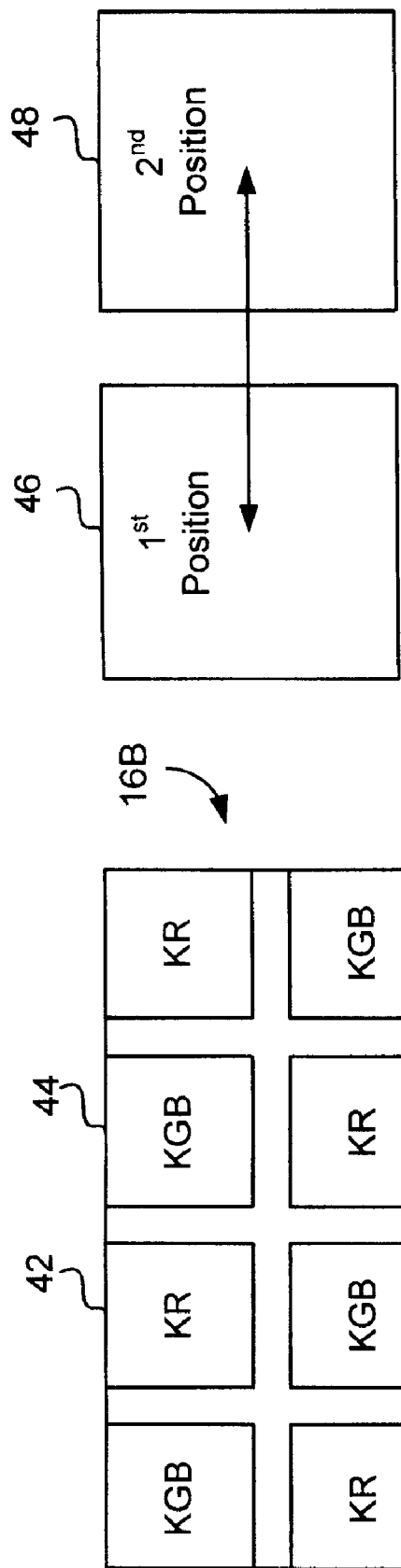
Fig. 5
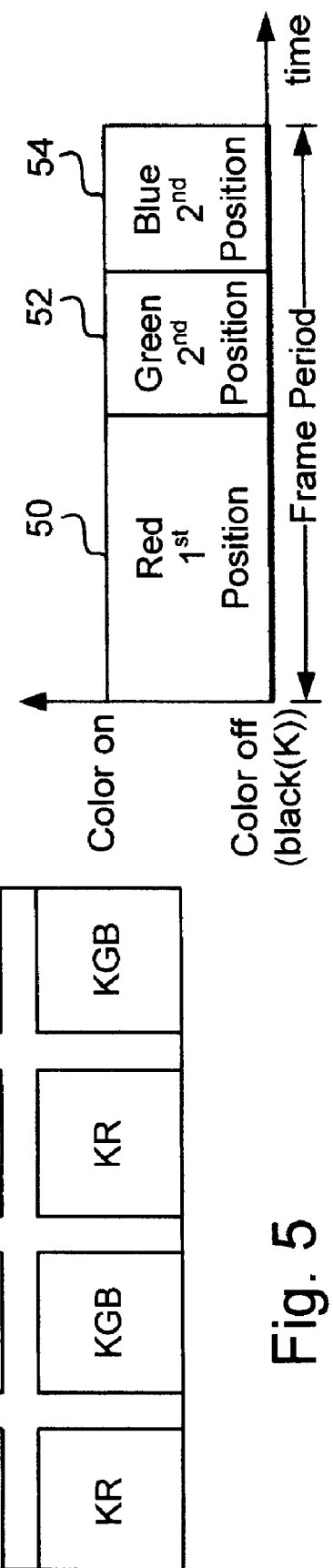
Fig. 6
Fig. 7

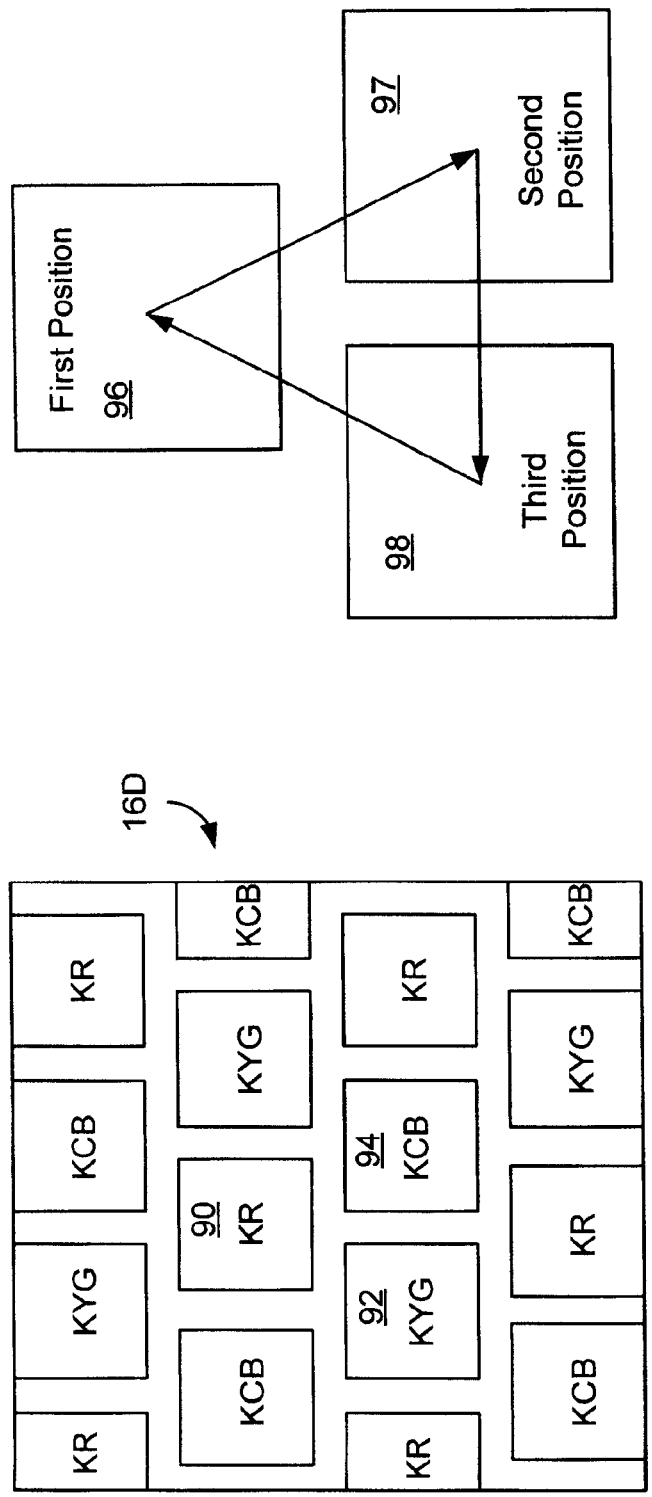
Fig. 11
Fig. 12
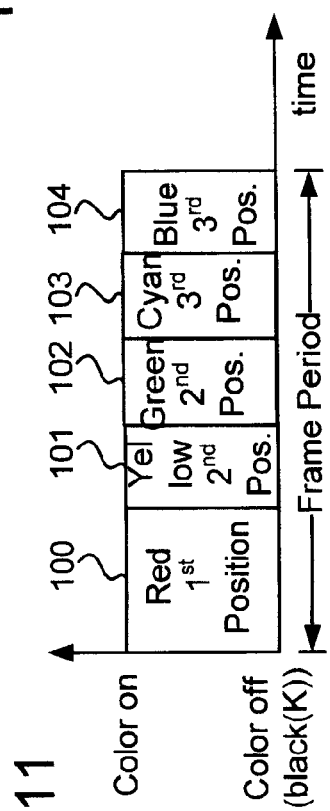
Fig. 13

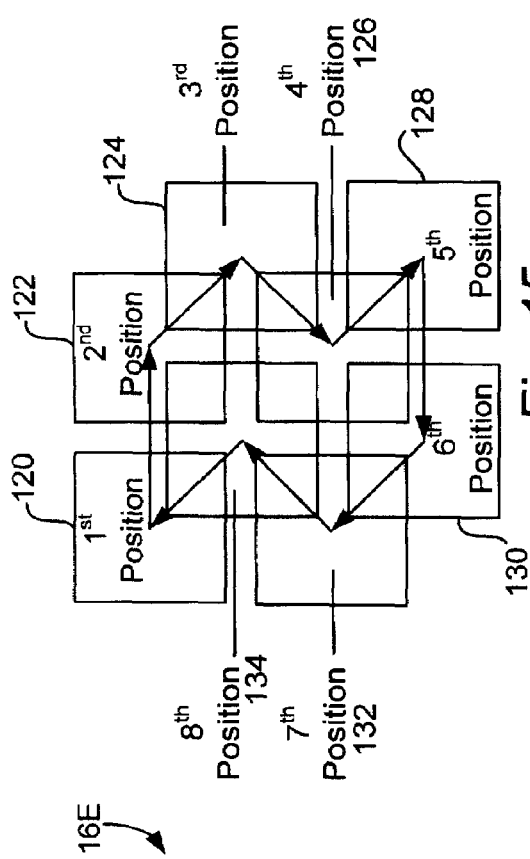
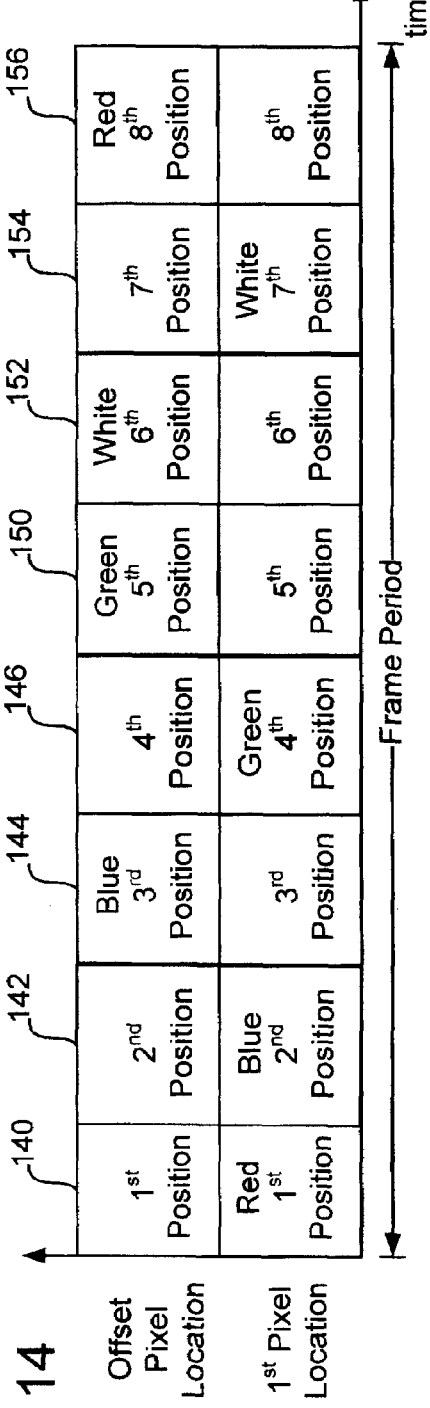
Fig. 14
Fig. 15
Fig. 16

PIXELATED COLOR WOBULATION

CROSS REFERENCE TO RELATED APPLICATIONS

This application is a divisional of commonly assigned U.S. patent application Ser. No. 11/078,212, filed Mar. 10, 2005, now U.S. Pat. No. 7,267,442, which is a continuation in part of commonly assigned U.S. patent application Ser. No. 10/969,412, filed Oct. 20, 2004 now U.S. Pat. No. 7,225,448, and is hereby incorporated by reference.

BACKGROUND OF THE INVENTION

A conventional system or device for displaying an image, such as a display, projector, or other digital imaging system, is frequently used to display a still or video image on a display surface, such as a display screen. Viewers evaluate display systems based on many criteria such as image size, color gamut, contrast ratio, brightness and resolution, for example. Image brightness, pixel color accuracy, and resolution are particularly important metrics in many display markets because the available brightness, color gamut and resolution can limit the size of a displayed image and control how well the image can be seen in venues having high levels of ambient light.

Many digital display systems create a full color display with a single light modulator by creating three or more modulated images in primary colors (red, green, and blue) per video frame. The primary colors are typically derived by passing a white light through a color wheel, prism, or some other color filter before causing the light to impinge the modulator. Sometimes, the white light is passed through a spatial light homogenizer after the color wheel to even out the intensity of the light over the area striking the modulator. The modulated images are sequentially displayed at a high rate so as to create a full color image in the human visual system. Thus, this method of generating a full color display is called "sequential color."

Color wheels add noise, thickness, expense, and complexity to a display system for a variety of reasons, including the inherent long-term reliability problems associated with moving mechanical parts. The embodiments described herein were developed in light of these and other drawbacks associated with known display systems.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

FIG. 5 is an exemplary partial view of a spatial light modulator illustrating an adjacent neighbor based color scheme used in one embodiment of the invention.

FIG. 6 is an exemplary diagram of an adjacent neighbor wobulated shift pattern in one embodiment of the invention.

FIG. 7 is an exemplary timing diagram of a frame period for one pixel location on a viewing surface used in one embodiment of the invention.

FIG. 11 is an exemplary partial view of a spatial light modulator illustrating an alternative triangular based color scheme used in one embodiment of the invention.

FIG. 12 is an exemplary diagram of an alternative triangular wobulated shift pattern in one embodiment of the invention.

FIG. 13 is an exemplary timing diagram of a frame period for one pixel location on a viewing surface used in one embodiment of the invention.

FIG. 14 is an exemplary partial view of a spatial light modulator illustrating an alternative rectangular based color scheme with resolution enhancement used in one embodiment of the invention.

FIG. 15 is an exemplary diagram of an alternative rectangular wobulated shift pattern with resolution enhancement in one embodiment of the invention.

FIG. 16 is an exemplary timing diagram of a frame period for one pixel location on a viewing surface used in one embodiment of the invention.

DETAILED DESCRIPTION

The embodiments described herein provide a full-fill projected image on a viewing surface using one color or interferometric modulator whose individual pixel elements cannot provide a full range of primary colors. The following embodiments allow for a low cost, robust, and single modulator display system without the need of a color wheel. In one embodiment, a projection system uses an interferometric-based light modulator to generate color pixels on a viewing surface. The light modulator is "digital" in the sense that each pixel element on the modulator generates one or two non-black colors. However, adjacent pixel elements have complementary primary colors. The modulator image is "wobulated" or otherwise spatially shifted such that the projected modulated pixels are displayed in an overlapped fashion on the viewing surface, allowing for each pixel location on the viewing surface to have a full range of primary colors such that each is capable of creating a perceived white pixel. Stated otherwise, a wobulation control circuit controls the displacement of the pixels generated by modulator on the viewing surface such that each pixel location on the viewing surface allows all primary colors to be generated.

For the purposes of this application, a perceived pixel is defined as a spot of light formed on the viewing surface. The location of a pixel is defined by the coordinates of the centroid of the pixel outline. A pixel element is an element on the light modulator that receives light from the light source, modulates the spectral (e.g. wavelength, frequency, and optionally incorporating intensity) distribution of the light, and defines at least one perceived pixel on the viewing surface. A primary color is defined by a limited spectral range within the visible light spectrum of the light source. A perceived pixel having a primary color is a spot of light characterized in that the pixel has a narrow spectral distribution that defines the primary color of the spot. A pixel array having interleaved pluralities of pixels is an array of spots characterized in that the array includes a first plurality of spots having a first primary color and a second plurality of spots having a second primary color and that the first and second primary colored spots form a known, preferably repeating, pattern. To spectrally modulate is to receive broadband wavelengths of light from a light source and to change the spectral distribution of the light source to narrow bands of wavelengths.

Figure 1:
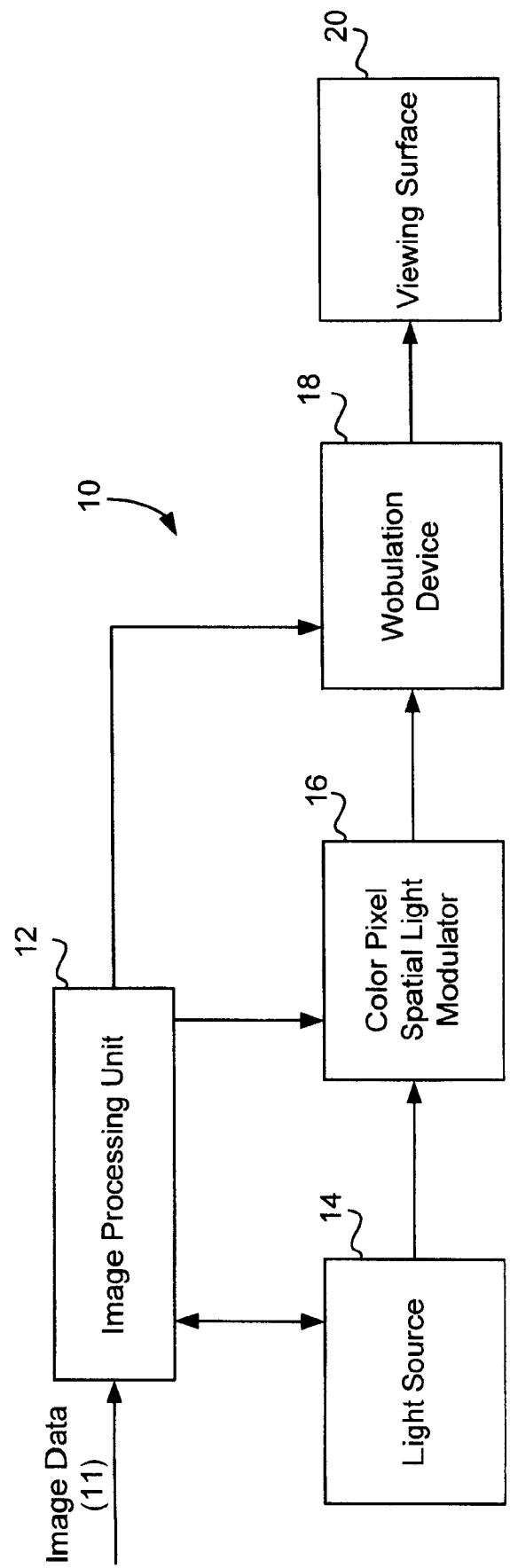
FIG. 1 is an exemplary block diagram of a display system according to one embodiment of the invention.

FIG. 1 is an exemplary block diagram of a display system 10 incorporating a pixelated color management device that incorporates different aspects of the invention. For instance the display system 10 includes an image processing unit 12 that receives image data 11 in analog or digital form and converts the data accordingly for processing. The image processing unit 12 may be implemented as a microcontroller, a digital signal processor, or general purpose CPU using a combination of logic and software or firmware. Alternatively, the image processing unit can be hard coded logic implemented in discrete or integrated circuits. The display system 10 includes a light source 14 that illuminates a color pixel spatial light modulator (SLM) 16. The light source 14 may include a high pressure arc-source, such as mercury vapor or xenon, or may include a solid state device including one or more semiconducting or organic LEDs. Alternatively, the light source 14 may include of one or more laser sources. The light source 14 will generally include a mechanism or optics to spatially homogenize the light such that it will be uniform in irradiance when projected onto the color pixel SLM 16. The color pixel SLM 16 has a plurality of individual pixels formed in an array such that each pixel is able to filter or otherwise spectrally modulate the light from the light source to provide one or more primary colors. In this example, the individual pixels are spatially distributed on the color pixel SLM 16 such that a color scheme is formed whereby neighboring pixels provide for complementary primary colors. In another example, the individual pixels are assigned a color by how they are controlled.

The light coming off the color pixel SLM 16 is controlled by wobulation device 18 before being transmitted or projected onto a viewing surface 20. The wobulation device 18 is controlled by the image processing circuit 12 to create a wobulation control circuit. The image processing unit 12 controls the light source 14, the color pixel SLM 16 and the wobulation device 18 in conjunction to place one or more frames of the received image data 11 on the viewing surface 20. The wobulation device 18 is able to spatially shift the image or array of pixels from the color pixel SLM 16 in one or more directions in either fill or partial (such as ½ pixel) increments to allow the individual pixels of the color pixel SLM 16 to overlap fully or partially on the viewing surface 20.

The color pixel SLM 16 is characterized in that each of its individual pixel elements are able to spectrally modulate the received light from the light source 14 and create at least one, perhaps two, or more narrow bands of light. One exemplary modulator is an interferometric modulator such as that found in U.S. patent Ser. No. 10/428,261, filed Apr. 30, 2003, and incorporated herein by reference. Another color pixel SLM modulator is an LCD panel that incorporates a color filter such that a color scheme is defined across the SLM array. Such LCD panels are available from several suppliers known to those of skill in the art. Another color pixel SLM modulator is liquid crystal on silicon (LCOS) which is available from several suppliers known to those of skill in the art. A diffractive based modulator such as that described in commonly assigned U.S. Pat. No. 6,747,785, may also be used as color pixel SLM 16. Alternatively, an active color pixel SLM can be used such as with an array of LED's or laser diodes. In this embodiment, the light source 14 and the color pixel SLM 16 are combined to form the active color pixel SLM.

A "pixel generator" is a functional combination of the light source 14 and the SLM 16. Absent operation of wobulation device 18, the pixel generator generates an array of pixels (colored spots of light) on the viewing surface 20. The array pixels include pixels having two or more primary colors that are displayed simultaneously and have a repeating pattern. Examples of such repeating patterns will become apparent in the discussions with respect to FIGS. 2-19. In one example, the repeating pattern might be red (R), green (G), blue (B), red, green, blue, etc. going in a particular direction. Absent operation of the wobulation device 18, the pixel generator cannot generate all primary colors at each pixel location and hence each primary color has a "depleted pattern" or a pixel pattern having incomplete coverage of viewing surface 20. In this one example, red only covers about on third of the area of the viewing surface 20. This may provide a severe "screen door" affect as well as providing only one third the areal resolution of the overall pixel array for that primary color. The wobulation device 18 displaces the pixels during a viewing period such as a frame period so that each primary color can more effectively cover the viewing surface 20 or more effectively address the locations on the viewing surface 20.

The wobulation device 18 may be formed of one or more optical shifting elements in a projection lens or as an adjustable refractive element. Alternatively, the wobulation device 18 may be a reflective component such as a rotatable, tilting, or movable mirrored surface. In general, the wobulation device can be any component that is able to move or bend the optical path of the image projected from the color pixel SLM 16 to create wobbling optics. Another wobulation device is a mechanical shifter that holds the color pixel SLM 16 and physically shifts the color pixel SLM 16 in one or more directions rather than its projected image. If the color pixel SLM 16 is physically shifted, the light source 14 may need to be designed to slightly overfill the array of pixels on the color pixel SLM 16 to account for such movement. Several different forms of wobulation devices are shown and described in commonly assigned US Patent Publication 2004-0027313A1, Ser. No. 10/242,545, filed Sep. 11, 2002 and hereby incorporated by reference.

The viewing surface 20 may be one of several different types and technologies. For instance, the viewing surface 20 may be a front projection screen, a rear projection screen, a video screen, or an appropriate reflective or transmissive surface such as a wall or paper.

Figure 2:
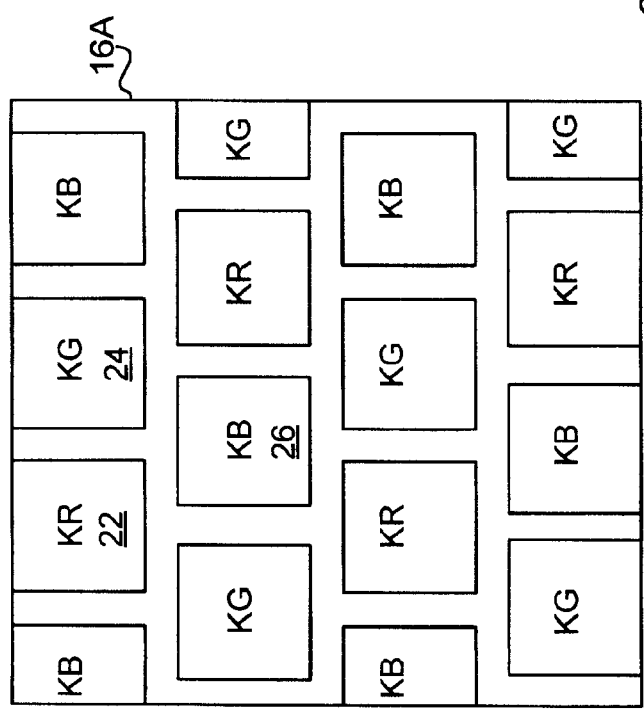
FIG. 2 is an exemplary partial view of a spatial light modulator illustrating a triangular based color scheme used in one embodiment of the invention.

FIG. 2 is an exemplary diagram of a portion of a color pixel SLM 16A in which the pixel elements 22, 24, and 26 are spatially distributed in a color scheme that is laid out in a triangular fashion that repeats over the pixel array. In this example, first pixel element 22 defines a red (R) pixel color primary, second pixel element 24 defines a green (G) pixel color primary, and third pixel element 26 defines a blue (B) pixel color primary. Each of the pixels may be turned off to a black (K) state. Different intensity levels of the colors can be provided by varying the amount of time a pixel is in the on or off state, such as by pulse width modulation.

Absent a wobulation device 18, the color pixel SLM 16A produces a pixel pattern on the screen approximately matching the pattern depicted in FIG. 2. As is seen, each primary color is depleted to about one third of full areal coverage (and slightly or more depending on the size of each pixel relative to locational pixel boundaries).

Figure 3:
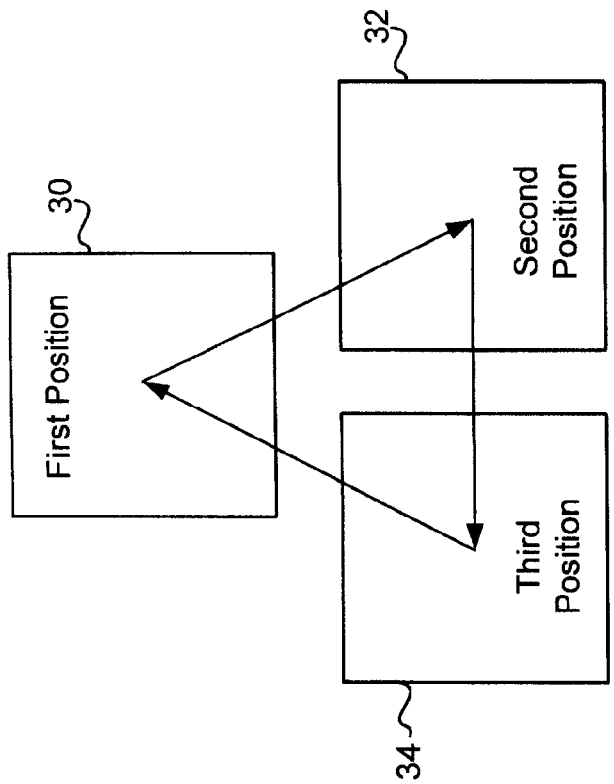
FIG. 3 is an exemplary diagram of a triangular wobulated shift pattern in one embodiment of the invention.

FIG. 3 is an exemplary diagram of the movement of a pixel element as it is projected onto the viewing surface 20. For instance, first pixel element 22 would be displayed at a first pixel location at first position 30 on the viewing surface 20 during one portion of an image frame period. For a frame period of $1/60$ of a second, the first position 30 would be occupied by first pixel element 22 for approximately $1/100^{th}$ of a second. During the next portion of the image frame period, the first pixel element 22 would be shifted by the wobulation control circuit 18 to occupy the second position 32 which is a second pixel location on the viewing surface 20. This position would be held for about $1/180^{th}$ of a second before the wobulation control circuit 18 shifts the first pixel element 22 to a third pixel location 34 on the viewing surface 20. The position would be held for $1/180^{th}$ of a second before being shifted by the wobulation control circuit 18 back to the first position 30. The intensity of the perceived pixel on the viewing surface can be controlled by adjusting the amount of time that the first pixel element 22 is actually enabled or activated while it occupies a particular pixel location on the viewing surface. For instance, the first pixel element 22 can be pulse width modulated to have a duty cycle of 50% to have one half of the full intensity while positioned at first position 30. To have a color depth of 8 bits, the first pixel element 22 would need to be controllable to have an off/on state of $1/256^{th}$ of $1/180^{th}$ of a second or $1/46,080^{th}$ of a second (about 21 microseconds) for a 60 frames per second (fps) video.

In some embodiments, spatial and/or temporal dithering of the pixel elements can be used to improve the image quality in such embodiments where the bit depth of the data controlling the pixel is not a large as desired. Alternatively, the pixel elements can be jittered or rotated rather than just being statically fixed after being shifted to a position. Another embodiment allows the pixel elements to be continually modulated based on their position even between the different positions.

By utilizing the displacement of the pixel elements as depicted and discussed with respect to FIG. 3, essentially full area coverage of the viewing area is provided for each primary color. Stated another way, each of pixel elements 22, 26, and 26 that display red, green, and blue respectively, can address multiple pixel locations on the viewing screen to reduce or eliminate primary color depletion.

Figure 4:
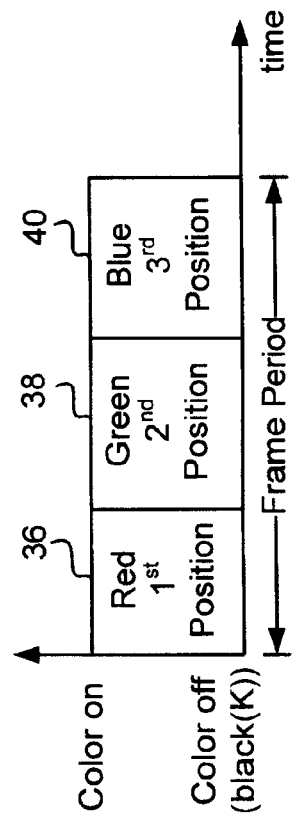
FIG. 4 is an exemplary timing diagram of a frame period for one pixel location on a viewing surface used in one embodiment of the invention.

FIG. 4 is an exemplary timing diagram showing the timing of a respective perceived pixel on the viewing surface to generate a full-on white pixel during a single image frame period. The modulator pixels can of course be modulated between the stated color and black to create a perceived pixel of many possible colors. During the first sub-period 36, the perceived pixel location has a red pixel such as first pixel 22 projected onto the pixel location. The first pixel 22 can be modulated appropriately during this sub-period 36 to achieve a desired intensity. During the second sub-period 38, the second pixel element 24, a green pixel is positioned or otherwise shifted by the wobulation control circuit 18 onto the perceived pixel location on the viewing surface. Again, during this sub-period 38, the second pixel element 24 can be appropriately modulated to provide a desired green intensity level. During the third sub-period 40, third pixel element 26, a blue pixel, is positioned or otherwise shifted by the wobulation control circuit 18 onto the perceived pixel location on the viewing surface. The third pixel element 24 can be appropriately modulated to provide a desired blue intensity level by turning the color on or off (that is, off being a black state).

By utilizing the displacement of the pixel array, locations on the viewing surface may be more completely addressed with all three primary colors. This eliminates a tendency of a particular single perceived pixel location to only be able to display red or black for instance. In the example discussed with respect to FIG. 4, a white pixel is perceived when all three primary colors are properly enabled in sequence for a particular pixel location.

FIG. 5 is an exemplary pixel element layout showing an alternative color scheme of a color pixel SLM 16B using a adjacent pixel approach to providing colors in which at least one of the adjacent pixels can support the creation of two non-black primary colors. For instance, first pixel element 42 can create red (R) or black (K) states while the second pixel element 44 is able to generate green (G), blue (B), or black (K) states.

FIG. 6 is an exemplary diagram of the movement of a pixel element as it is projected onto the viewing surface 20 for the color pixel SLM 16B of FIG. 5. For instance, first pixel element 42 would be displayed at a first pixel location at first position 46 on the viewing surface 20 during one portion of an image frame period. In one example (see FIG. 7), for a frame period of $1/60^{th}$ of a second, the first position 46 would be occupied by first pixel element 42 for about $1/120^{th}$ of a second. During the next portion of the image frame period, the first pixel element 42 would be shifted by the wobulation control circuit 18 to occupy the second position 48 which is a second pixel location on the viewing surface 20. This position would be held for about $1/120^{th}$ of a second before the wobulation control circuit 18 shifts the first pixel element 42 back to the first pixel location 46 on the viewing surface 20. The intensity of the perceived pixel on the viewing surface can be controlled by adjusting the amount of time that the first pixel element 42 is actually enabled while it occupies a particular pixel location on the viewing surface. For instance, the first pixel element 42 can be pulse width modulated with a duty cycle of 25% to have one-forth of the full intensity while positioned at first position 46. To have a color depth of 8 bits, the first pixel element 42 would need to be controllable to have an off/on state of $1/256^{th}$ of $1/120^{th}$ of a second or $1/30,720^{th}$ of a second (about 32 microseconds) for a 60 fps video.

For the second pixel element 44, since it generates two primary colors during the $120^{th}$ of a second interval that it is held at either the first position 46 or the second position 48, its operates at twice the speed of the first element 42 which only supports one red color in order to support equal color bit depths for a full white perceived pixel. Thus, the second pixel element 44 could display a green color during the first $1/240^{th}$ of a second of a sub-period interval, and a blue color during that second $1/240^{th}$ of a second of the sub-period interval.

For example, FIG. 7 illustrates an exemplary timing diagram of a respective perceived pixel on the viewing surface 20 during a single image frame period for this embodiment. During the first sub-period 50, the perceived pixel location has a red pixel such as first pixel 42 projected onto the pixel location. The first pixel 42 can be modulated appropriately during this first sub-period 50 to achieve a desired intensity. During the second sub-period 52, the second pixel element 44 creates a green pixel positioned or otherwise shifted by the wobulation control circuit 18 onto the perceived pixel location of the viewing surface. Again, during this second sub-period 52, the second pixel element 44 can be appropriately modulated to provide a desired green intensity level. During the third sub-period 54 the second pixel element 44 creates a blue pixel onto the perceived pixel location of the viewing surface 20. The second pixel element 44 can be appropriately modulated to provide a desired blue intensity level by turning the color on or off.

The timing of the wobulation shifting shown in FIG. 7 is particularly useful with a red-deficient light source such as a high pressure mercury vapor arc-source light source. This increased timing for the red period allows for the more red light from the light source to be placed on the viewing surface at the expense of overall brightness.

Figure 8:
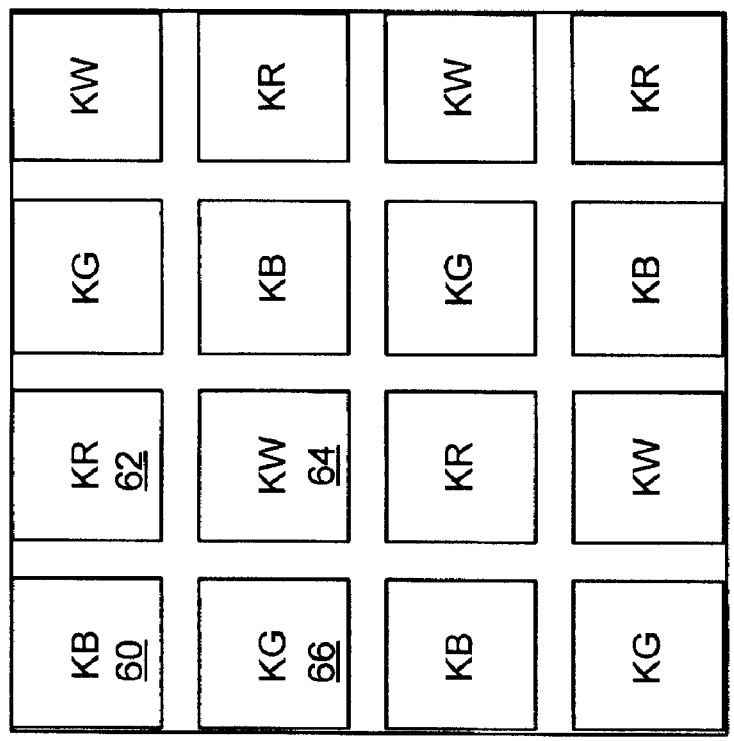
FIG. 8 is an exemplary partial view of a spatial light modulator illustrating a rectangular based color scheme used in one embodiment of the invention.

Alternatively, if one wishes to balance the gamut and the brightness, a color scheme which incorporates a white pixel as shown in FIG. 8 may be used. FIG. 8 is a partial view of an array of pixel elements in a color pixelated SLM 16C which has at least one white pixel element along with the primary color elements. For instance, color pixelated SLM 16C has a first pixel element 60 which is capable of generating a black (K) or blue color, a second pixel element 62 which is capable of generating a black or red color, a third pixel element 66 which is capable of generating a black or white (W) (such as unfiltered) light, and a fourth pixel element 64 which is capable of generating a black or green color.

Figure 9:
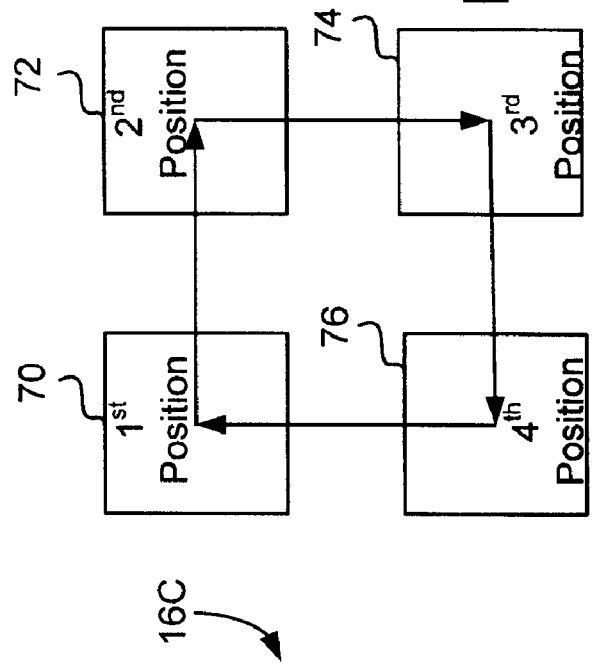
FIG. 9 is an exemplary diagram of a rectangular wobulated shift pattern in one embodiment of the invention.

FIG. 9 is an exemplary diagram of the movement of a pixel element of color pixelated SLM 16C as it is projected onto the viewing surface 20. For instance, first pixel element 60 would be displayed at a first pixel location at first position 70 on the viewing surface 20 during one portion of an image frame period. For a frame period of $\frac{1}{60}^{th}$ of a second, the first position 70 would be occupied by first pixel element 60 for about $\frac{1}{240}^{th}$ of a second. During the next portion of the image frame period, the first pixel element 60 would be shifted by the wobulation control circuit 18 to occupy the second position 72 which is a second pixel location on the viewing surface 20. This position would be held for about $\frac{1}{240}^{th}$ of a second before the wobulation control circuit 18 shifts the first pixel element 60 to a third pixel location 74 on the viewing surface 20. This position would be held for about $\frac{1}{240}^{th}$ of a second before being shifted by the wobulation control circuit 18 to a forth pixel location 76. This position would be held for about $\frac{1}{240}^{th}$ of a second before being shifted by the wobulation control circuit 18 back to the first pixel location 70. The intensity of the perceived pixel on the viewing surface can be controlled at each position by adjusting the amount of time that the first pixel element 60 is actually enabled while it occupies a particular pixel location on the viewing surface. For instance, the first pixel element 60 can be pulse width modulated to have a duty cycle of 75% to have ¾th of the full intensity while positioned at first position 70. To have a color depth of 8 bits, the first pixel element 60 would need to be controllable to have an off/on state of $\frac{1}{256}^{th}$ of $\frac{1}{240}^{th}$ of a second or $\frac{1}{61,440}^{th}$ of a second (about 16 microseconds) for a 60 fps video.

Figure 10:
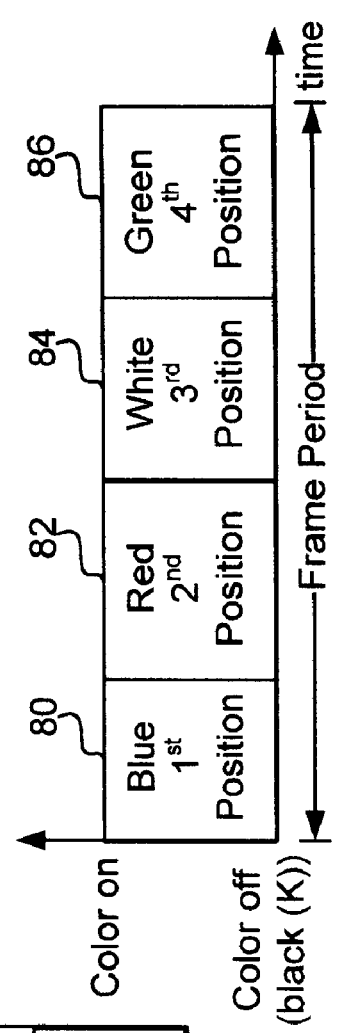
FIG. 10 is an exemplary timing diagram of a frame period for one pixel location on a viewing surface used in one embodiment of the invention.

FIG. 10 is an exemplary timing diagram showing the timing of a respective perceived pixel on the viewing surface 20 during a single image frame period. During the first sub-period 80, the perceived pixel location has a blue pixel such as first pixel 60 projected onto the pixel location. The first pixel 60 can be modulated appropriately during this sub-period 80 to achieve a desired intensity. During the second sub-period 82, the second pixel element 62, a red pixel is positioned or otherwise shifted by the wobulation control circuit 18 onto the perceived pixel location on the viewing surface. Again, during this sub-period 82, the second pixel element 62 can be appropriately modulated to provide a desired red intensity level. During the third sub-period 84, third pixel element 66, a white pixel, is positioned or otherwise shifted by the wobulation control circuit 18 onto the perceived pixel location on the viewing surface. The third pixel element 64 can be appropriately modulated to provide a desired white intensity level by turning the pixel on or off. Finally, during the fourth sub-period 86, the fourth pixel element 66, a green pixel, is positioned or otherwise shifted by the wobulation control circuit 18 onto the perceived pixel location on the viewing surface. The fourth pixel element 66 can be appropriately modulated to provide a desired green level by turning the pixel on or off. The wobulation control circuit 18 then shifts or adjusts the first pixel element onto the perceived pixel location on the viewing surface 20 for the next image frame period.

Alternatively, in another embodiment, the color gamut can be increased by including more than three primary colors. For instance, FIG. 11 is an exemplary diagram of a portion of a color pixel SLM 16D in which the pixel elements 90, 92, and 94 are spatially distributed in a color scheme that is laid out in a triangular fashion that repeats over the pixel array. In this example, first pixel element 90 defines a red pixel color primary, second pixel element 92 defines both yellow (Y) and green pixel color primaries, and third pixel element 94 defines both cyan (C) and blue pixel color primaries.

FIG. 12 is an exemplary diagram of the movement of a pixel element as it is projected onto the viewing surface 20. For instance, first pixel element 90 would be displayed at a first pixel location at first position 96 on the viewing surface 20 during one portion of an image frame period. For a frame period of $\frac{1}{60}^{th}$ of a second, the first position 96 would be occupied by first pixel element 90 for about $\frac{1}{180}^{th}$ of a second. During the next portion of the image frame period, the first pixel element 90 would be shifted by the wobulation control circuit 18 to occupy the second position 97 which is a second pixel location on the viewing surface 20. This position would be held for about $\frac{1}{180}^{th}$ of a second before the wobulation control circuit 18 shifts the first pixel element 90 to a third pixel location 98 on the viewing surface 20. The position would be held for about $\frac{1}{180}^{th}$ of a second before being shifted by the wobulation control circuit 18 back to the first position 96. The intensity of the perceived pixel on the viewing surface can be controlled by adjusting the amount of time that the first pixel element 90 is actually enabled while it occupies a particular pixel location on the viewing surface. For instance, the first pixel element 90 can be pulse width modulated to have a duty cycle of 10% to have one-tenth full intensity while positioned at first position 96. To have a color depth of 8 bits, the first pixel element 90 would need to be controllable to have an off/on state of $\frac{1}{256}^{th}$ of $\frac{1}{180}^{th}$ of a second or $\frac{1}{46,080}^{th}$ of a second (about 21 microseconds) for a 60 fps video. For the second pixel element 92 and third pixel element 94, since they each control two colors, they would need to operate at twice the speed of the first pixel element 96 or alternatively they could support smaller color depths.

FIG. 13 is an exemplary timing diagram showing the timing of a respective perceived pixel on the viewing surface during a single image frame period. During the first sub-period 100, the perceived pixel location has a red pixel such as first pixel 90 projected onto the pixel location. The first pixel 90 can be modulated appropriately during this sub-period 100 to achieve a desired intensity. During the second sub-period 101, the second pixel element 92 is positioned or otherwise shifted by the wobulation control circuit 18 onto the perceived pixel location on the viewing surface. Again, during this sub-period 101, the second pixel element 24 can be appropriately modulated to provide a desired yellow intensity level before spectrally and intensity modulating the light during the third sub-period 102 to create green light. During the fourth sub-period 103, third pixel element 94 is positioned or otherwise shifted by the wobulation control circuit 18 onto the perceived pixel location on the viewing surface. The third pixel element 94 can be appropriately modulated to provide a desired cyan intensity before spectrally and intensity modulating the light during the fifth sub-period 104 to create blue light.

In addition to color wobulation, the wobulation control circuit 16 can be used to also increase the perceived resolution of the perceived image on the viewing surface 20 by shifting or otherwise positioning the pixel elements on the pixel locations of the viewing surface 20 by moving the pixel elements location on the viewing surface 20 as illustrated in FIG. 15. Thus, both color and image resolution wobulation can be achieved with embodiments of this invention by allowing for non-integer shifts by the wobulation control circuit 18.

FIG. 14 is a partial view of an array of pixel elements in a color pixelated SLM 16E which has at least one white pixel element along with the primary color elements such as shown in FIG. 8. For instance, color pixelated SLM 16E has a first pixel element 60 which is capable of generating a black (K) or blue color, a second pixel element 62 which is capable of generating a black or red color, a third pixel element 66 which is capable of generating a black or white (such as unfiltered) light, and a fourth pixel element 64 which is capable of generating a black or green color.

FIG. 15 is an exemplary diagram of the movement of a pixel element of color pixelated SLM 16E as it is projected onto the viewing surface 20. For instance, first pixel element 60 would be displayed at a first pixel location at first position 120 on the viewing surface 20 during one portion of an image frame period. For a frame period of $1/60^{th}$ of a second, the first position 120 would be occupied by first pixel element 60 for about $1/480^{th}$ of a second. During the next portion of the image frame period, the first pixel element 60 would be shifted by the wobulation control circuit 18 to occupy the second position 122 which is a second pixel location on the viewing surface 20. This position would be held for about $1/480^{th}$ of a second before the wobulation control circuit 18 shifts the first pixel element 60 to a third pixel location 124 on the viewing surface 20. This position would be held for about $1/480^{th}$ of a second before being shifted by the wobulation control circuit 18 to a fourth pixel location 126. This position would be held for about $1/480^{th}$ of a second before being shifted by the wobulation control circuit 18 to the fifth pixel location 128. This position would be held for about $1/480^{th}$ of a second before the wobulation control circuit 18 shifts the first pixel element 60 to a sixth pixel location 130 on the viewing surface 20. This position would be held for about $1/480^{th}$ of a second before being shifted by the wobulation control circuit 18 to a seventh pixel location 132. This position would be held for about $1/480^{th}$ of a second before being shifted by the wobulation control circuit 18 to the eighth pixel location 134 which would also be held for $1/480^{th}$ of a second before being shifted back to the first position 120. The intensity of the perceived pixel on the viewing surface can be controlled at each position by adjusting the amount of time that the first pixel element 60 is actually enabled while it occupies a particular pixel location on the viewing surface. For instance, the first pixel element 60 can be pulse width modulated to have a duty cycle of 75% to have $3/4^{th}$ of the full intensity while positioned at first position 120. To have a color depth of 8 bits, the first pixel element 60 would need to be controllable to have an off/on state of $1/256^{th}$ of $1/480^{th}$ of a second or $1/120,880^{th}$ of a second (about 8 microseconds) for a 60 fps video.

FIG. 16 is an exemplary timing diagram showing the respective timings of a respective perceived pixel at a first location on the viewing surface 20 during a single image frame period and a second (adjacent) offset pixel location on the viewing surface 20. During the first sub-period 140, the first pixel location has a red pixel such as second pixel 62 projected onto the pixel location. The second pixel 62 can be modulated appropriately during this sub-period 140 to achieve a desired intensity. During the second sub-period 142, the first pixel element 60, a blue pixel is positioned or otherwise shifted by the wobulation control circuit 18 onto the first perceived pixel location on the viewing surface. Again, during this sub-period 142, the first pixel element 60 can be appropriately modulated to provide a desired blue intensity level. During the third sub-period 144, the first pixel element 62, a blue pixel, is positioned or otherwise shifted by the wobulation control circuit 18 onto the offset pixel location on the viewing surface. The first pixel element 62 can be appropriately modulated to provide a desired blue intensity level by turning the pixel on or off. During the fourth sub-period 1466, the fourth pixel element 66, a green pixel, is positioned or otherwise shifted by the wobulation control circuit 18 onto the first pixel location on the viewing surface. The fourth pixel element 66 can be appropriately modulated to provide a desired green level by turning the pixel on or off. The wobulation control circuit 18 then shifts or adjusts the fourth pixel element 66 onto the offset pixel location on the viewing surface 20 for the fifth image frame period 150. Again, during this sub-period 150, the fourth pixel element 66 can be appropriately modulated to provide a desired green intensity level. During the sixth sub-period 152, the third pixel element 64, a white pixel, is positioned or otherwise shifted by the wobulation control circuit 18 onto the offset pixel location on the viewing surface. The third pixel element 64 can be appropriately modulated to provide a desired white intensity level by turning the pixel on or off. During the seventh sub-period 154, the third pixel element 64, a white pixel, is positioned or otherwise shifted by the wobulation control circuit 18 onto the first pixel location on the viewing surface. The third pixel element 64 can be appropriately modulated to provide a desired white level by turning the pixel on or off. The wobulation control circuit 18 then shifts or adjusts the second pixel element 62 onto the offset pixel location on the viewing surface 20 for the eighth image frame period 156. The second pixel element 62 can be appropriately modulated to provide a desired red intensity level by turning the pixel on or off. During the next frame period's first sub-period 140, the second pixel element 62, a red pixel, is positioned or otherwise shifted by the wobulation control circuit 18 back onto the first pixel location on the viewing surface.

Figure 18:
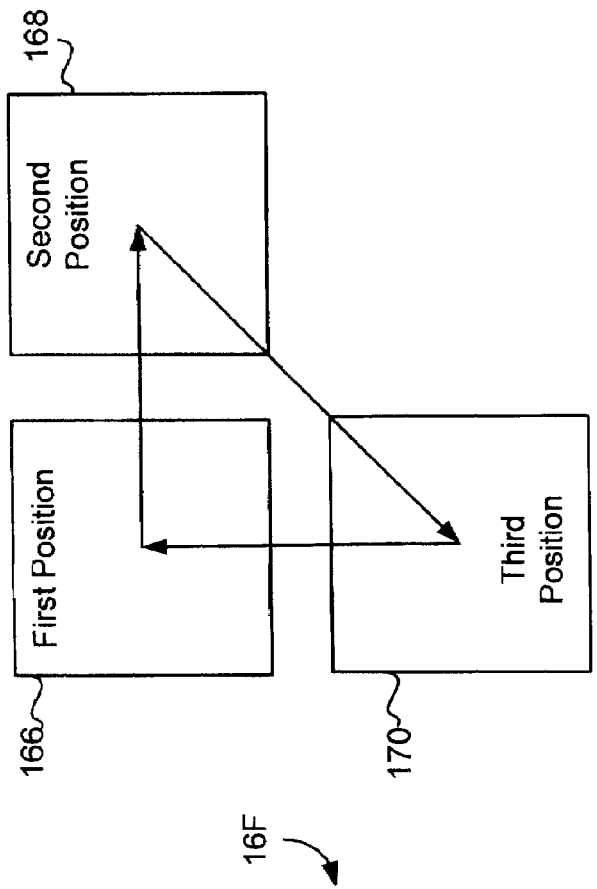
FIG. 18 is an exemplary diagram of an alternative triangular wobulated shift pattern in one embodiment of the invention.
Figure 19:
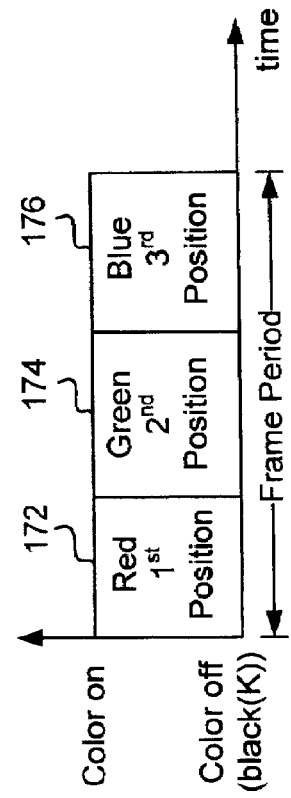
FIG. 19 is an exemplary timing diagram of a frame period for one pixel location of a viewing surface used in one embodiment of the invention.
Figure 17:
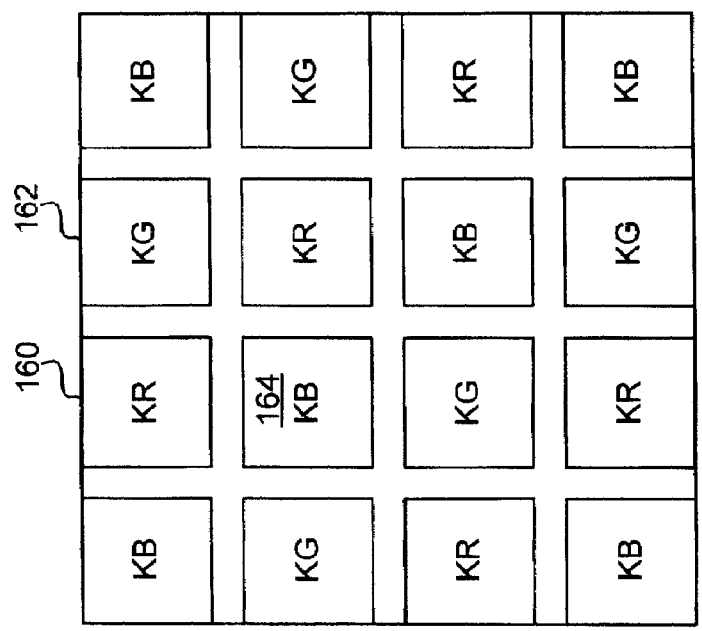
FIG. 17 is an exemplary partial view of a spatial light modulator illustrating an alternative rectangular based color scheme used in one embodiment of the invention.

While earlier examples have shown the modulator pixel color patterns and the wobulation shift sequence patterns as being similar, it is possible to have the modulator pixels distributed in a rectangular pattern and the wobulation shift sequence triangular. This combination would still allow for full areal coverage of the pixel colors. FIGS. 17-19 illustrate such an embodiment.

FIG. 17 is an exemplary diagram of a portion of a color pixel SLM 16F in which the pixel elements 160, 162, and 164 are spatially distributed in a color scheme that is laid out in a rectangular fashion that repeats over the pixel array. In this example, first pixel element 160 defines a red pixel color primary, second pixel element 162 defines a green pixel color primary, and third pixel element 164 defines a blue pixel color primary.

Absent a wobulation device 18, the color pixel SLM 16F produces a pixel pattern on the screen approximately matching the pattern depicted in FIG. 17. As is seen, each primary color is depleted to about one third of full areal coverage FIG. 18 is an exemplary diagram of the movement of a pixel element as it is projected onto the viewing surface 20. For instance, first pixel element 160 would be displayed at a first pixel location at first position 166 on the viewing surface 20 during one portion of an image frame period. For a frame period of $1/60$ of a second, the first position 166 would be occupied by first pixel element 160 for approximately $1/180^{th}$ of a second. During the next portion of the image frame period, the first pixel element 160 would be shifted by the wobulation control circuit 18 to occupy the second position 168 which is a second pixel location on the viewing surface 20. This position would be held for about $1/180^{th}$ of a second before the wobulation control circuit 18 shifts the first pixel element 160 to a third pixel location 170 on the viewing surface 20. The position would be held for $1/180^{th}$ of a second before being shifted by the wobulation control circuit 18 back to the first position 166. The intensity of the perceived pixel on the viewing surface can be controlled by adjusting the amount of time that the first pixel element 160 is actually enabled or activated while it occupies a particular pixel location on the viewing surface. For instance, the first pixel element 160 can be pulse width modulated to have a duty cycle of 50% to have one half of the full intensity while positioned at first position 166. To have a color depth of 8 bits, the first pixel element 160 would need to be controllable to have an off/on state of $1/256^{th}$ of $1/180^{th}$ of a second or $1/46,080^{th}$ of a second (about 21 microseconds) for a 60 frames per second (fps) video.

By utilizing the displacement of the pixel elements as depicted and discussed with respect to FIG. 18, essentially full area coverage of the viewing area is provided for each primary color. Stated another way, each of pixel elements 160, 162, and 164 that display red, green, and blue respectively, can address multiple pixel locations on the viewing screen to reduce or eliminate primary color depletion.

FIG. 19 is an exemplary timing diagram showing the timing of a respective perceived pixel on the viewing surface to generate a full-on white pixel during a single image frame period. The modulator pixels can of course be modulated between the stated color and black to create a perceived pixel of many possible colors. During the first sub-period 172, the perceived pixel location has a red pixel such as first pixel 160 projected onto the pixel location. The first pixel 160 can be modulated appropriately during this sub-period 172 to achieve a desired intensity. During the second sub-period 174, the second pixel element 162, a green pixel is positioned or otherwise shifted by the wobulation control circuit 18 onto the perceived pixel location on the viewing surface. Again, during this sub-period 174, the second pixel element 162 can be appropriately modulated to provide a desired green intensity level. During the third sub-period 176, third pixel element 164, a blue pixel, is positioned or otherwise shifted by the wobulation control circuit 18 onto the perceived pixel location on the viewing surface. The third pixel element 164 can be appropriately modulated to provide a desired blue intensity level by turning the color on or off (that is, off being a black state).

By utilizing the displacement of the pixel array, locations on the viewing surface may be more completely addressed with all three primary colors while still employing a rectangular arrayed pattern. This eliminates a tendency of a particular single perceived pixel location to only be able to display red or black for instance. In the example discussed with respect to FIG. 18, a white pixel is perceived when all three primary colors are properly enabled in sequence for a particular pixel location.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A pixelated color management device, comprising:
   a spatial light modulator having a plurality of groups of pixel elements, each group of pixel elements comprising at least two pixel elements in which a first pixel element is configured to selectively produce either of two different primary colors and a second pixel element is configured to produce an additional different primary color; and
   a wobulation control circuit configured to selectively change which pixel element in each said group provides output to a specific pixel location on a viewing surface, that pixel location corresponding to that group of pixel elements such that any of said pixel elements in that said group of pixel elements may provide output to said specific pixel location on said viewing surface.

2. The device of claim 1, in which said primary colors comprise red, green and blue.

3. The device of claim 2, in which said group of pixel elements comprises three pixel elements which respectively produce red, green, and blue output and are in a triangular distributed manner.

4. The device of claim 2, in which said second pixel element produces the color red, and said first pixel element produces the colors green and blue color, said first and second pixel elements being arranged in an adjacent neighbor distributed manner.

5. The device of claim 2, in which each group of pixel elements together selectively produce red, green, blue, and white colors and the pixel elements in each group are arranged in a rectangular distributed manner.

6. The device of claim 1, in which each group of pixel elements together selectively produce red, yellow-green, and cyan-blue colors and the pixel elements in each group are arranged in a triangular distributed manner.

7. The device of claim 1 wherein the spatial light modulator is a Fabry-Perot interference based modulator.

8. The device of claim 1, further comprising:
   projection optics wherein the wobulation control circuit modifies the optical path within the projection optics in a least one direction over eight positions.

9. The device of claim 8 wherein the wobulation control circuit controls at least one of a first and a second direction.

10. The device of claim 1, further comprising:
    projection optics optically coupled to the spatial light modulator to project the plurality of individually defined pixels of the spatial light modulator in a first and a second direction to a display surface, and wherein the wobulation control circuit controls at least one of the first and second direction of the projection optics.

11. A display system comprising:
a color pixel spatial light modulator,
   wherein said spatial light modulator comprises a plurality of grouped pixel elements,
   wherein each group of pixel elements comprises at least two adjacent pixel elements that produce light of different colors such that, any color of a primary color set can be produced by one of said pixel elements in each group of pixel elements;
a viewing surface, wherein each pixel of said viewing surface corresponds to a said group of pixel elements of said spatial light modulator; and
a wobulation device for wobulating an image produced by said spatial light modulator such that each pixel element of said group of pixel elements of said spatial light modulator display is optically coupled to the corresponding pixel of said viewing surface during a frame period.

12. The display system of claim 11, wherein at least one of said pixel elements in each group of pixel elements of said spatial light modulator produces at least two different colors of said primary color set.

* * * * *

UNITED STATES PATENT AND TRADEMARK OFFICE
CERTIFICATE OF CORRECTION

PATENT NO. : 7,600,874 B2  Page 1 of 1
APPLICATION NO. : 11/782530
DATED : October 13, 2009
INVENTOR(S) : Winthrop D. Childers et al.

It is certified that error appears in the above-identified patent and that said Letters Patent is hereby corrected as shown below:

In column 1, line 10, delete "7,225,448," and insert -- 7,255,448, --, therefor.

In column 3, line 59, delete "fill" and insert -- full --, therefor.

In column 5, line 16, delete "1/100$^{th}$" and insert -- 1/180$^{th}$ --, therefor.

In column 12, line 61, in Claim 8, delete "a" and insert -- at --, therefor.

Signed and Sealed this

Eighteenth Day of May, 2010

David J. Kappos
*Director of the United States Patent and Trademark Office*